H. MOORE.
VEHICLE WHEEL.
APPLICATION FILED NOV. 20, 1909.
1,005,276.
Patented Oct. 10, 1911.
2 SHEETS—SHEET 2.
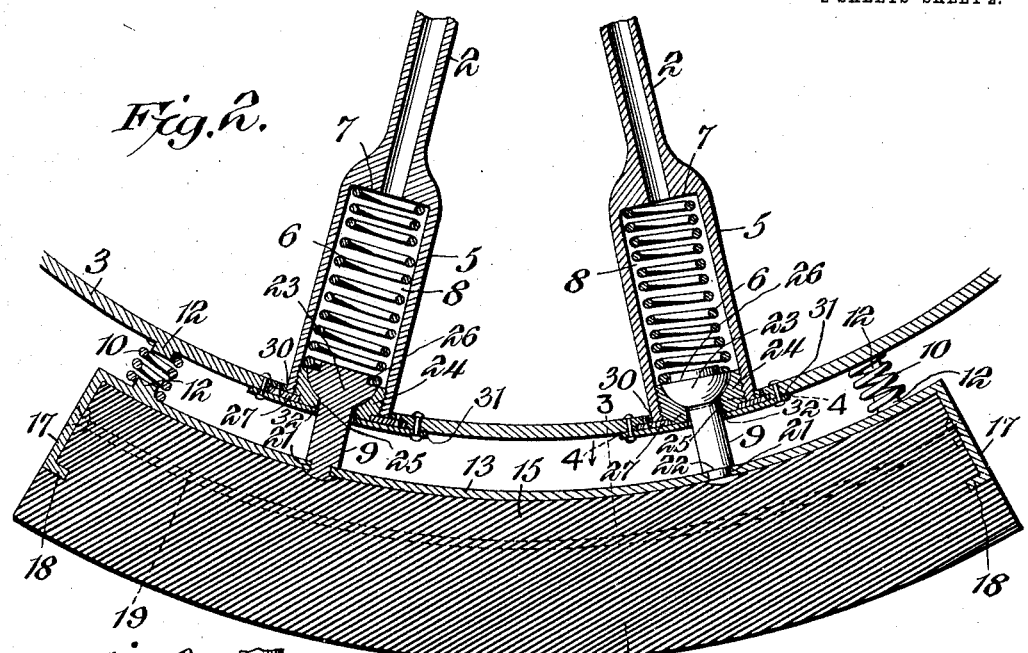
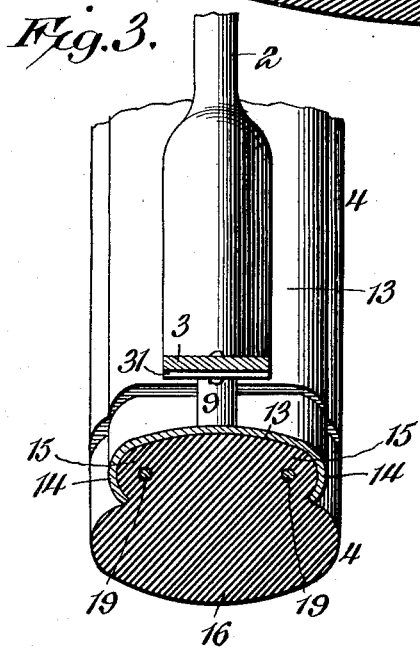
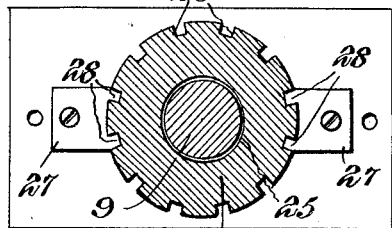
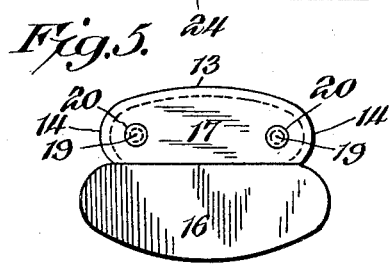
Hughes Moore, Inventor,
Witnesses
Howard D. Orr.
C. Bradway.
By C. G. Siggers.
Attorney

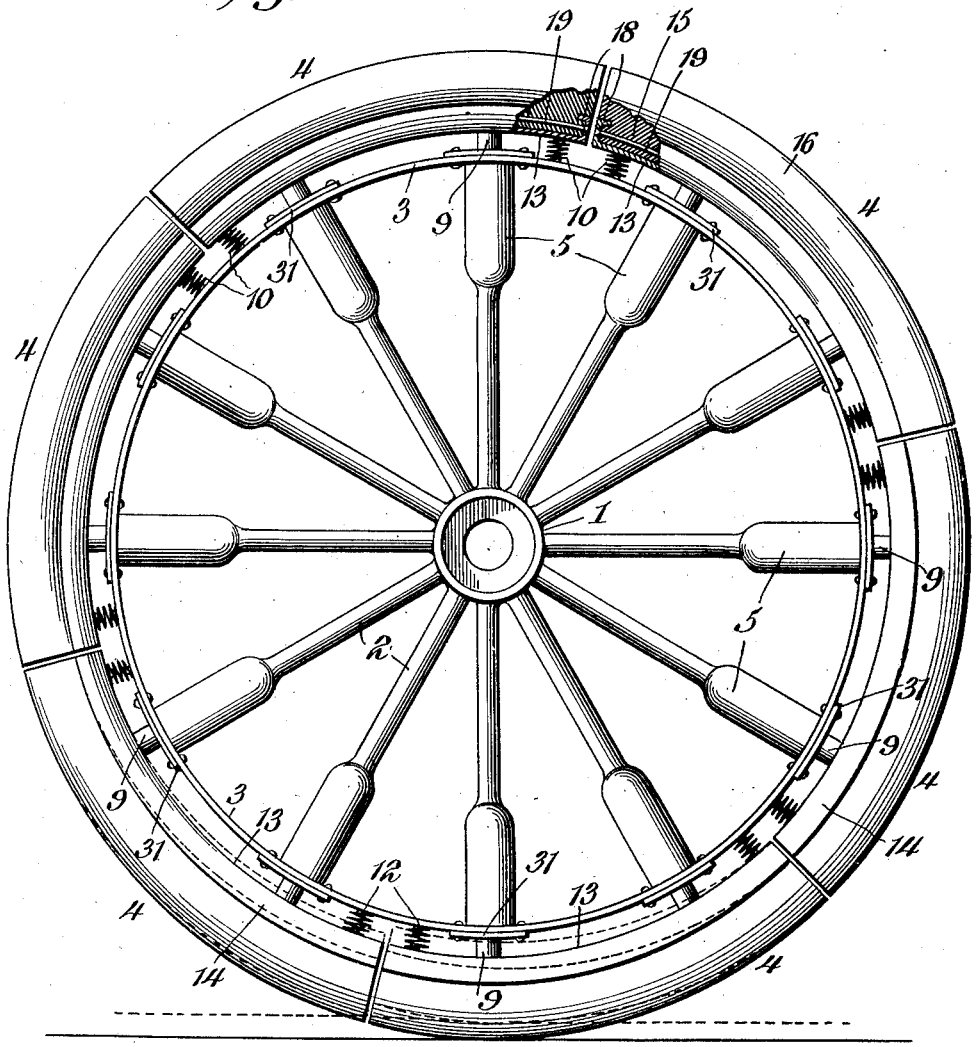

UNITED STATES PATENT OFFICE.

HUGHES MOORE, OF LOUISVILLE, KENTUCKY.

VEHICLE-WHEEL.

1,005,276.　　　　Specification of Letters Patent.　　Patented Oct. 10, 1911.

Application filed November 20, 1909. Serial No. 529,141.

*To all whom it may concern:*

Be it known that I, HUGHES MOORE, a citizen of the United States, residing at Louisville, in the county of Jefferson and State of Kentucky, have invented a new and useful Vehicle-Wheel, of which the following is a specification.

This invention relates to a vehicle wheel of that character in which the felly is made up of a plurality of sections having separate cushioning means for insuring easy running of the vehicle over rough places in the roadway.

The invention has for one of its objects to provide a wheel of this character which is of simple and durable construction, and so designed as to afford considerable resiliency while capable of standing rough service, the wheel being especially adapted for heavy vehicles such as trucks, although it is not necessarily limited to this class of vehicles.

Another object of the invention is the provision of a wheel which has its circumference made up of segmental felly and tire sections having improved cushioning means whereby the individual sections can yield as they come in contact with the road surface and meet obstructions therein.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side elevation of a wheel with portions broken away to show certain details of construction. Fig. 2 is an enlarged detail sectional view of a portion of the wheel. Fig. 3 is a transverse section on line 3—3, Fig. 2. Fig. 4 is a detail sectional view on line 4—4, Fig. 2. Fig. 5 is an end view of one of the tire sections.

Similar reference characters are employed to designate corresponding parts throughout the views.

Referring to the drawings, 1 designates the hub of a wheel from which radiate spokes 2 that carry at their outer ends a felly or rim 3, and extending around this felly and spaced therefrom are tire segments or sections 4 which are of such length as to cover two or more spokes. The spokes have their outer ends enlarged into heads 5 that are chambered longitudinally of the spokes for accommodating stiff helical cushioning springs 6. These springs have their inner ends bearing against shoulders 7 formed by the ends of the chambers 8 in the spokes, while their outer ends bear upon followers 9 that connect with the tire sections for permitting the latter to yield inwardly. In the present instance, each tire section is connected with a pair of followers, and disposed between the felly and tire sections are secondary cushioning springs 10 arranged preferably at the ends of each section and retained on oppositely-arranged lugs 12 on the felly and tire sections respectively.

Each tire section consists of a metal base 13 of arcuate form that is of channeled tranverse cross section, there being side flanges 14, as shown in Fig. 3, which curve inwardly toward each other to form overhanging side walls behind which the base portion 15 of the rubber or other yielding member 16 engages. The ends of the base sections 13 are formed with radial flanges 17 that have inwardly-extending ribs 18 which are embedded in the ends of the tread members so as to coöperate with the side flanges 14 for holding each tread member on its metal base. Retaining wires 19 pass longitudinally through the base portion of each tread member and the ends of these wires pass through countersunk openings 20 in the end walls 17 of the metal base and are upset in the openings to securely hold the wires in place. The metal base 13 has openings 21 in its arcuate bottom for receiving the outer ends of the followers, which ends are reduced to provide shoulders 22 for bearing against the inner face of the base, while the ends of the followers are upset against the outer face of the base to rigidly fasten the followers to the respective tire sections so as to move back and forth therewith during the yielding movement of the tire sections.

The followers 9 have hemispherical heads 23 which bear in cupped bearing pieces 24 screwed into the outer ends of the spokes, the bearing pieces having openings 25 through which the followers project outwardly. By this arrangement, a ball and socket joint is provided between each follower and the inner section of the wheel composed of the hub, spokes and felly. The head 23 of each follower has an annular seat 26 on its inner end for receiving the outer end of the compression spring 6, whereby the follower can move without the spring becoming disconnected from the follower. The bearing piece or nut 24 is prevented from turning by means of key plates 27 having lugs 28 which engage in notches 29 in the periphery of the bearing piece adjacent its outer face, these key plates being fastened in any suitable manner to the felly. The felly 3 has openings 30 in which the outer ends of the spokes engage, and the key plates 27 are secured to the felly at these openings to engage the bearing pieces. Cover plates 31 are riveted or otherwise suitably secured to the outside of the felly to prevent the spokes from working through the openings, and the followers 9 pass through apertures 32 in these plates. With a wheel constructed in this manner, the tire sections successively yield as they come in contact with the road surface and the springs coöperate with the rubber of the tire sections to take up shocks resulting from the wheel coming into contact with obstructions so that smooth running will be secured. As the tire sections are constructed of solid rubber, there is no danger of puncturing, as is the case with pneumatic tires, so that comparatively little attention is required to maintain the wheel in operative condition.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desired to secure by Letters Patent, is:—

1. A wheel comprising a hub, spokes connected therewith having hollow outer ends, a felly rigidly secured to the outer ends of the spokes, segmental tire sections, a plurality of followers secured to each tire section and extending into the adjacent spokes, springs in the spokes, and ball and socket bearings between the followers and spokes.

2. A wheel comprising a hub, spokes connected therewith, a felly rigidly secured to the outer ends of the spokes, a tire made up of segmental sections, each section including a space embraced by a plurality of spokes and stopping at each end at a point substantially intermediate of two spokes, elastic supporting means for each tire section coincident with and directly carried by the spokes included in the length of the tire section, and yielding cushioning means individual to the tire section and between the same and the felly adjacent the ends of the tire section.

3. A wheel comprising an inner unitary section composed of a hub, spokes and felly; and an outer section composed of a plurality of tire segments; a plurality of followers connecting each segment with the inner section of the wheel, yielding devices for permitting inward movement of the tire segments; and ball and socket bearings between the inner ends of the followers and the inner section of the wheel whereby universal movement of the tire segments is permitted.

4. A wheel provided with a felly with spokes rigidly secured thereto and having their outer ends hollow, the felly having passages through it coincident with the hollow outer ends of the spokes, a tire made up of segmental sections each of a length to include a plurality of spokes, springs housed in the hollow ends of the spokes, plungers connected to each tire section at separated points coinciding with the hollow ends of the spokes included in the length of the section and entering the corresponding hollow ends of the spokes and engaged by the springs in the respective spokes, and springs interposed between each tire section and the felly at the ends of the tire section.

5. A wheel comprising an inner section consisting of a hub, spokes having hollow outer ends, and a felly secured to the outer ends of the spokes; an outer section consisting of a plurality of tire segments; a plurality of inwardly-extending followers on each segment projecting into the hollow outer ends of adjacent spokes; springs in the spokes pressing against the followers; said followers having hemispherical heads on their inner ends; and cupped bearing pieces rigidly secured in the spokes for receiving the heads of the followers.

6. A wheel comprising a plurality of spokes having hollow outer ends, a felly having openings for receiving the outer ends of the spokes, a bearing piece screwed into the outer portion of the hollow end of each spoke and formed with locking means, coacting locking means fast to the felly in engagement with the locking means of the bearing piece and removable independently of the said bearing piece, springs within the hollow ends of the spokes, and tire sections each provided with followers passing through the felly and bearing pieces in the spokes and within the said spokes engaged by the springs.

7. A wheel comprising spokes having hollow outer ends, compression springs arranged in the spokes, a bearing piece threaded in the outer end of each spoke and having its inner face cupped, a follower passing through each bearing piece and having an enlarged head for engaging in the cupped side of the latter, a felly secured to the outer ends of the spokes, means for preventing the bearing pieces from turning in the spokes, and tire sections secured to the outer ends of the followers.

8. A wheel provided with hollow spokes each housing a spring and having at the outer end a partially spherical seat, and a tire made up of separated sections, each section being of a length to include a plurality of spokes and provided with spaced plunger members in number and spacing equal to the number of spokes included in the length of the tire sections, said plungers each entering a respective spoke and there provided with a partially spherical head adapted to the partially spherical seat at the end of the spoke, the spring within the spoke engaging the head at the end of the plunger and tending normally to hold it in its seat.

In testimony, that I claim the foregoing as my own, I have hereto affixed my signature in the presence of two witnesses.

HUGHES MOORE.

Witnesses:
 HENRY M. GOODMAN,
 JOHN H. THOMAS.

Copies of this patent may be obtained for five cents each, by addressing the "Commissioner of Patents, Washington, D. C."